United States Patent
Sundaram P

(10) Patent No.: US 10,740,760 B2
(45) Date of Patent: Aug. 11, 2020

(54) FRAMEWORK FOR MANAGING ONLINE TRANSACTIONS IN INTERNET OF THINGS (IOT)

(71) Applicant: SAP SE, Walldorf (DE)

(72) Inventor: Meenakshi Sundaram P, Walldorf (DE)

(73) Assignee: SAP SE, Walldorf (DE)

( * ) Notice: Subject to any disclaimer, the term of this patent is extended or adjusted under 35 U.S.C. 154(b) by 310 days.

(21) Appl. No.: 15/591,124

(22) Filed: May 10, 2017

(65) Prior Publication Data
US 2018/0330380 A1   Nov. 15, 2018

(51) Int. Cl.
| | |
|---|---|
| G06Q 20/02 | (2012.01) |
| G06Q 20/32 | (2012.01) |
| G06F 9/46 | (2006.01) |
| G06Q 20/40 | (2012.01) |

(52) U.S. Cl.
CPC ................ *G06Q 20/4016* (2013.01)

(58) Field of Classification Search
CPC .......... G06Q 20/02; G06Q 20/32; G06F 9/46
USPC ......................................................... 705/44
See application file for complete search history.

(56) References Cited

U.S. PATENT DOCUMENTS

| | | | | |
|---|---|---|---|---|
| 8,423,466 B2* | 4/2013 | Lanc | ..................... | G06Q 20/32 705/44 |
| 8,984,113 B2 | 3/2015 | Li et al. | | |
| 9,112,782 B2* | 8/2015 | Siddiqui | ................... | G06F 9/46 |
| 9,372,922 B2 | 6/2016 | Shaashua et al. | | |
| 2011/0047082 A1 | 2/2011 | Barbier et al. | | |
| 2013/0198082 A1* | 8/2013 | Eichner | .................. | G06Q 20/02 705/44 |
| 2015/0278810 A1 | 10/2015 | Ramatchandirane et al. | | |
| 2016/0283933 A1 | 9/2016 | Orlando et al. | | |
| 2016/0308861 A1 | 10/2016 | Ameling et al. | | |

OTHER PUBLICATIONS

Meenakshi Sundaram P; Database Management System With Dynamic Allocation of Database Requests; U.S. Appl. No. 15/401,209, filed Jan. 9, 2017; p. 1-39.

* cited by examiner

*Primary Examiner* — Clifford B Madamba
(74) *Attorney, Agent, or Firm* — Buckley, Maschoff & Talwalkar LLC

(57) ABSTRACT

Methods and system are disclosed that execute processing a payment event. In one aspect, via a framework, a request for initiating a payment event from a smart device via a smart terminal is received. Upon processing the initiated request, the received request may be authenticated based on a configuration information associated with the payment event. When the authentication is successful, a session to process the request including the payment event may be established. Based on the established session, whether to execute processing the payment event based on a combination of transaction context associated with the payment event and a device identifier associated with the smart device. Based on the determination, processing the payment event may be executed.

20 Claims, 5 Drawing Sheets

FRAMEWORK FOR MANAGING ONLINE TRANSACTIONS IN INTERNET OF THINGS (IOT)

BACKGROUND

Real world enterprise processes and applications typically execute on integrated heterogeneous systems. For example, systems, applications and processes that are associated with processing information using online platforms (e.g., over a network using internet) may include heterogeneous platforms with complex landscape. Further, such heterogeneous platforms may be inefficient, have multiple complex point to point communication nodes, inflexible and not scalable, may perform data replication at multiple points, thereby adding to redundancy and increasing costs. Further such heterogeneous platforms lack facilities for unified reporting and may operate with a high risk of regulatory compliance. Therefore, providing a framework with a unified architecture with simplified platform for seamlessly integrating the enterprise systems by overcoming the above operational and data management complexities, may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Figure 1:
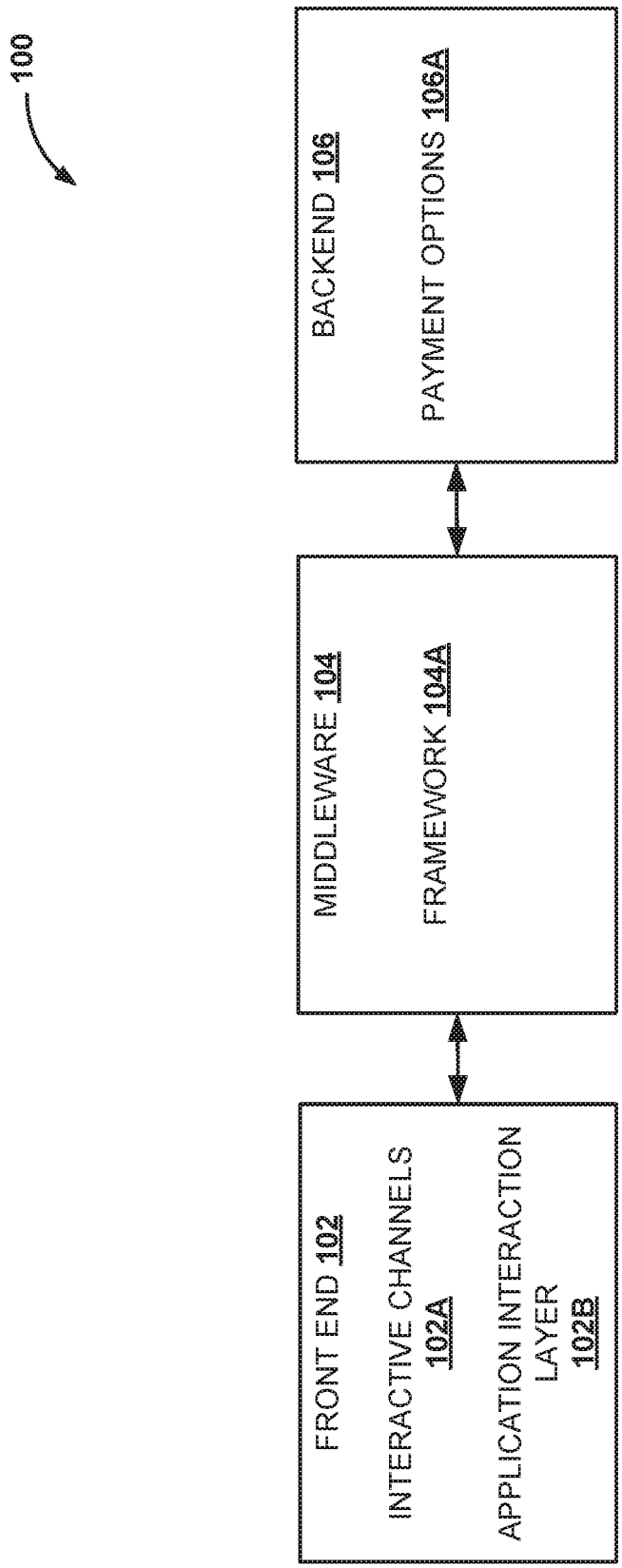
FIG. 1 is a block diagram illustrating an environment to execute processing a payment event, according to an embodiment.

Embodiments of techniques related to framework for managing online transactions in internet of things (IoT) are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a feature, structure, or characteristic described in connection with the embodiment is included in at least one of the one or more embodiments. Thus, the appearances of these phrases in various places throughout this specification are not necessarily all referring to the same embodiment. Furthermore, the features, structures, or characteristics may be combined in any suitable manner in one or more embodiments.

Technological advancements in $21^{st}$ century and beyond continues to propel a demand for connected devices, networks, platforms and integrated environments. Such an advancement may increase a demand for platforms (e.g., frameworks) via which users can interact (e.g., initiate requests for services such as online transactions, payment events, etc.) with multiple systems and applications to execute operations and functionalities. In an embodiment, such frameworks may provide a platform for unified architecture encompassing the devices, networks and integrated environments, that may be scalable (e.g., on demand, based on evolving requirement, etc.) for seamless integration of multiple systems and applications (e.g., on demand systems, on premise systems, etc.).

In an embodiment, the framework may provide the user a platform for unified data such that the integrity of the data consumed by the user is consistent and the data is communicated over a secured platform. The framework may also provide reusability of system and application components (e.g., existing user interface (UI) components or applications or parts of applications, data, etc.), thereby optimizing the performance of the systems and applications. In an embodiment, the framework may provide executing operations or functionalities such as, receiving initiated requests for processing payment events, establishing user sessions, validating user identities, providing a platform to manage configuration information (e.g., configuration of certain payment events, association of payment methods based on type of transactions, etc.), determining contextual information for payment event, etc. In an embodiment, configuration information may include information, such as, when the request for the payment event is initiated from a mobile phone, the associated payment method may be linked to a credit card and the payment event may be processed using the linked credit card. For example, configuration information may be information that may determine conditions for making payments, such as, (1) single payment or periodic payment, where periodic is weekly, biweekly, monthly, etc., (2) type of payment, such as reimbursable work or personal payment, (3) payee subject matter, such as vehicle payment, mortgage payment, rent, utilities, insurance, credit cards, etc. (4) payment amount variance, such as fixed amount or variable amount, as well as conditions for determining variance, etc. (5) payment conditions such as automatically pay on a given date or pay only after sending a message and receiving payment confirmation via email or messaging, (6) source of payment funds, such as current account, savings, credit card, or debit card, etc., (7) limiting payments by setting up payment limits, for example, $5000 USD, etc., (8) default payment options setup like paying for certain kind of payment events and associated payment methods, such as using specific debit cards, credit cards, etc. The framework may work in cooperation with multiple on premise or cloud platform applications or systems (e.g., proprietary and non-proprietary enterprise systems that may provide payment options) that may be deployed at a backend in the integrated environment.

In an embodiment, the framework may include an integrated platform of cooperatively functioning multitier layers, software components (singularly referred to a software component or a component), software routines, engines, functional models, etc., providing execution of specific functionalities or operations. In an embodiment, the terms multitier layers (e.g., secure communication layer, application interface layer, identity management layer, configuration management layer, session management layer, connectivity management layer, abstraction layer, persistency layer, data publishing and distribution layer, infrastructure management layer, etc.), models, software components, components, software routines, engines, routines, layers etc., may correspond to an execution of a sequence of instructions by a processor of a computing device (e.g., computer, mobile device, etc.) deployed in the integrated environment. Such an execution of the sequence of instructions may render the computing device to perform one or more functions that were not performed previously or may render improved functionality of the computing device and the operations performed by the computing device. The above multitier layers, functional models, software components, software routines, etc., may be reused based on definition and implementation. Execution of the instructions associated with the above multitier layers, functional models, software components, software routines, etc., may further improve the execution of functionalities or operations associated with the multiple systems.

FIG. 1 is a block diagram illustrating an environment 100 to execute processing a payment event, according to an embodiment. FIG. 1 shows environment 100 including front end 102, middleware 104 and backend 106. In an embodiment, front end 102 may provide an interface to interact and execute functionalities at backend 106 via framework 104A. The front end 102 may include an integration of interactive channels 102A working in cooperation with application interaction layer 102B. Such cooperative working may facilitate or provide a platform for initiating requests by end users. For example, such requests may be associated with processing of payment events, requests for processing payment events or executing online transactions associated with payments.

In an embodiment, multiple users may initiate multiple requests for processing the payment events or transactions. Such requests may be received via interactive channels 102A in cooperation with application interaction layer 102B. The received requests may further be processed at framework 104A by software components. The framework 104A may include software components that may be integrated and deployed as functional layers. In an embodiment, the software components deployed as functional layers may work in cooperation with each other to process the requests for payment events. The requests for the payment events or transactions may be sequentially processed by each layer in framework 104A, where specific operations or functionalities may be executed for processing the requests for payment events.

In an embodiment, via one or multiple interactive channels 102A and application interaction layer 102B, framework 104A may receive a request initiated for a payment events or transactions. For instance, the request for the transactions may be initiated from a smart device (e.g., smart watch, smart ring, mobile device, portable electronic device, etc.) at a smart terminal (e.g., point of sale terminal or electronic terminal communicating with the framework 104A via application interaction layer). Upon processing the initiated request, the request may be authenticated at framework 104A based on configuration information associated with the payment event. When the authentication is successful, a user session to process the request for payment event at framework 104A may be established. For example, the authentication is successful when a combination specific device (e.g., mobile phone, smart watch, etc.) initiating the request for processing the payment event and the associated payment method (e.g., digital wallet, credit cards, debit cards, etc.) is a validated. For example, suppose that a mobile device A is the associated payment method that is linked to a credit card A. When the user initiates a request for processing the payment event via the mobile device A using the linked credit card A, the request for payment event (e.g., for the specific type of expense) may be validated by prompting the user to enter a one-time password (OTP), sent by the framework to the user's mobile device. When the user enters the OTP, the framework may authenticate the user and establish the user session for further processing the payment event. In an embodiment, establishing the session may correspond to establishing a unique communication channel for exchanging information between the user and the framework. The unique communication channel for exchanging the information between the user may be associated with a unique transaction identifier. The sessions may maintain user specific state, including persistent objects. For example, the session could be used to track a validated user followed by a series of directed activities for the user. In an embodiment, the session may be configured to be terminated based on conditions such as, when the transaction is processed successfully or the user authentication fails or after a predetermined time.

In an embodiment, when the authentication fails, an authentication failure notification may be sent to the smart terminal via framework 104A. The request for the payment event may be processed by different layers or components (not shown) at framework 104A. Based on the established connection, the request may be processed and forwarded to the different layers or components in framework 104A. In an embodiment, based on a combination of a transaction context associated with the payment event and a device identifier associated with the smart device, framework 104A may include software routines determine whether to process the payment event. For example, the transaction context may be established by a combination of the configuration information, as discussed previously, the interactive channels and device identifiers via which the request for payment event may be initiated, the specific type of expense (e.g., payment event), etc. Based on such determination, the request for processing the payment event may be executed (by connecting with payment options 106A at backend 106).

Figure 2:
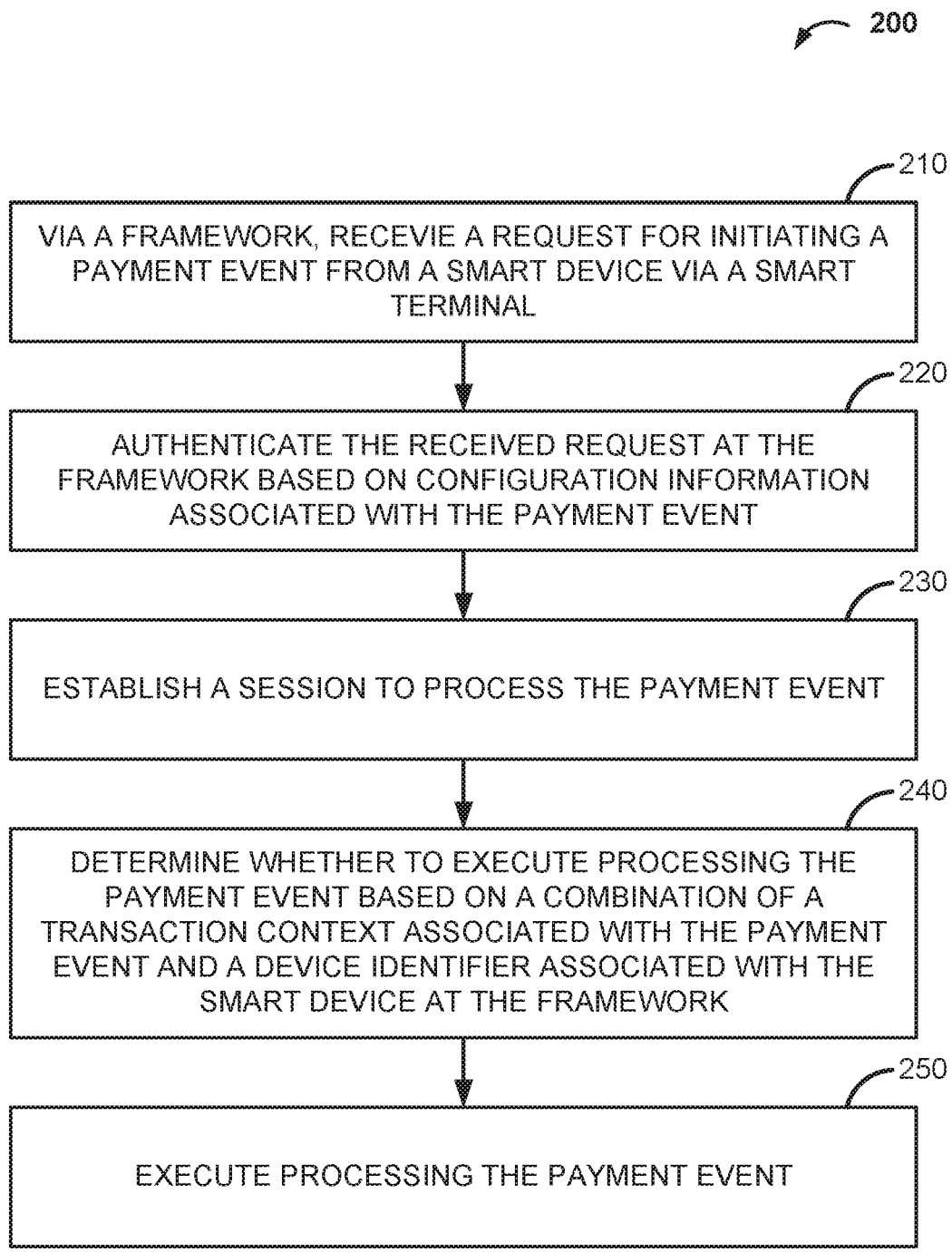
FIG. 2 is a flow diagram illustrating a process to execute processing a payment event, according to an embodiment.

FIG. 2 is a flow diagram illustrating process 200 to execute processing a payment event, according to an embodiment. In an embodiment, a payment event may be executed on a system at a backend upon processing at a framework. The framework may cooperatively work with front end and back end to execute processing the payment events. In an embodiment, the front end may include interactive channels, application interaction layer, etc., and the backend may include multiple systems, applications, gateways, interfaces, etc. The multiple systems, applications, gateways, interfaces, etc., may be deployed on-premise environment or on distributed computing environment (e.g., cloud computing systems). In an embodiment, the framework may receive a request to execute processing a payment event via the front end. For example, a user may initiate such requests via interactive channels such as, web services (e.g., online transactions via user interfaces or online applications), smart rings, wearable computers, smart keychains, applications on mobile devices, smart devices or electronic devices integrated to communicate using near frequency (NFC) communication, smart watches, etc. In an embodiment, the users may select the interactive channel via which the payment request may be initiated. The users may initiate ether one transaction at a time or sequentially initiate multiple transactions via multiple interactive channels.

In an embodiment, via a framework, a request for initiating a payment event from a smart device via a smart terminal, is received, at 210. The request may be initiated via a selected interactive channel at the front end and may be received by application interaction layer at the framework. Upon processing the initiated request, the received request authenticated at the framework based on configuration information associated with the payment event, at 220. For example, such configuration information may be generated during the design phase of configuring the user information by the framework. For example, such configuration information may include a combination of attributes and parameters associated with user credentials (e.g., first name, last name, social security or national/state identification number, etc.), payment method (e.g., digital wallets, credit cards, debit cards, mobile device, etc.) associated with the payment event, context of payment event (e.g., as explained previously, for example, payment event associated for buying books, payment event associated with monthly recurring expenses, like rent, groceries, etc.), device identifiers (e.g., international mobile equipment identity (IMEI), electronic serial number, equipment identifier number, etc.) via which the request for payment events may be initiated, etc.

In an embodiment, when the authentication is successful, a session to execute processing the payment event is established, at 230. For example, a secured user session may be established via the framework with the backend systems to execute processing the payment request. In an embodiment, based on the established session, whether to execute processing the payment event, is determined, at 240. The determination is based on a combination of a transaction context associated with the payment event (e.g., transaction context associated with the payment event may be determined from the configuration information, as discussed previously), a device identifier associated with the smart device initiating the request, and the above configuration information. When such a determination is successful, processing the payment event is executed, at 250. For example, the device identifier may correspond to one as explained previously.

In an embodiment, when a user authentication for the initiated request for the payment event fails or is unsuccessful, an authentication failure notification may be sent to the smart terminal and/or the user via the framework. In another embodiment, when the user authentication is unsuccessful, the failure notification may be sent to a message inbox associated with the user. For example, the message inbox may be linked with the user mobile device and the user may receive the failure notification as a text message. In an embodiment, the framework may determine a payment context (e.g., payment event associated with buying books, payment events associated with recurring expenses, etc., as explained previously) associated with the payment event. For example, the framework may determine the payment context based on the above configuration information and may also include information related to type of payment event. In an embodiment, a transaction context may be determined by the framework that may include: determining attributes of the payment event based on the configuration information associated with the payment event; determining parameters associated with the smart device; and based on a combination of the determined attributes of the payment event and the determined parameters associated with the smart device, the framework may determine whether to execute the processing of the payment event.

In an embodiment, the framework may determine an upper limit (also referred to as transaction limit) associated with a transaction or payment event. For example, the framework may determine the transaction limit based on a combination of the type of payment event and constraints associated with the payment event. Such constraints may be defined in the configuration information during the design time via the framework. Based on the determined transaction limit for the payment event, the framework may determine whether to execute processing the payment event.

Figure 3A:
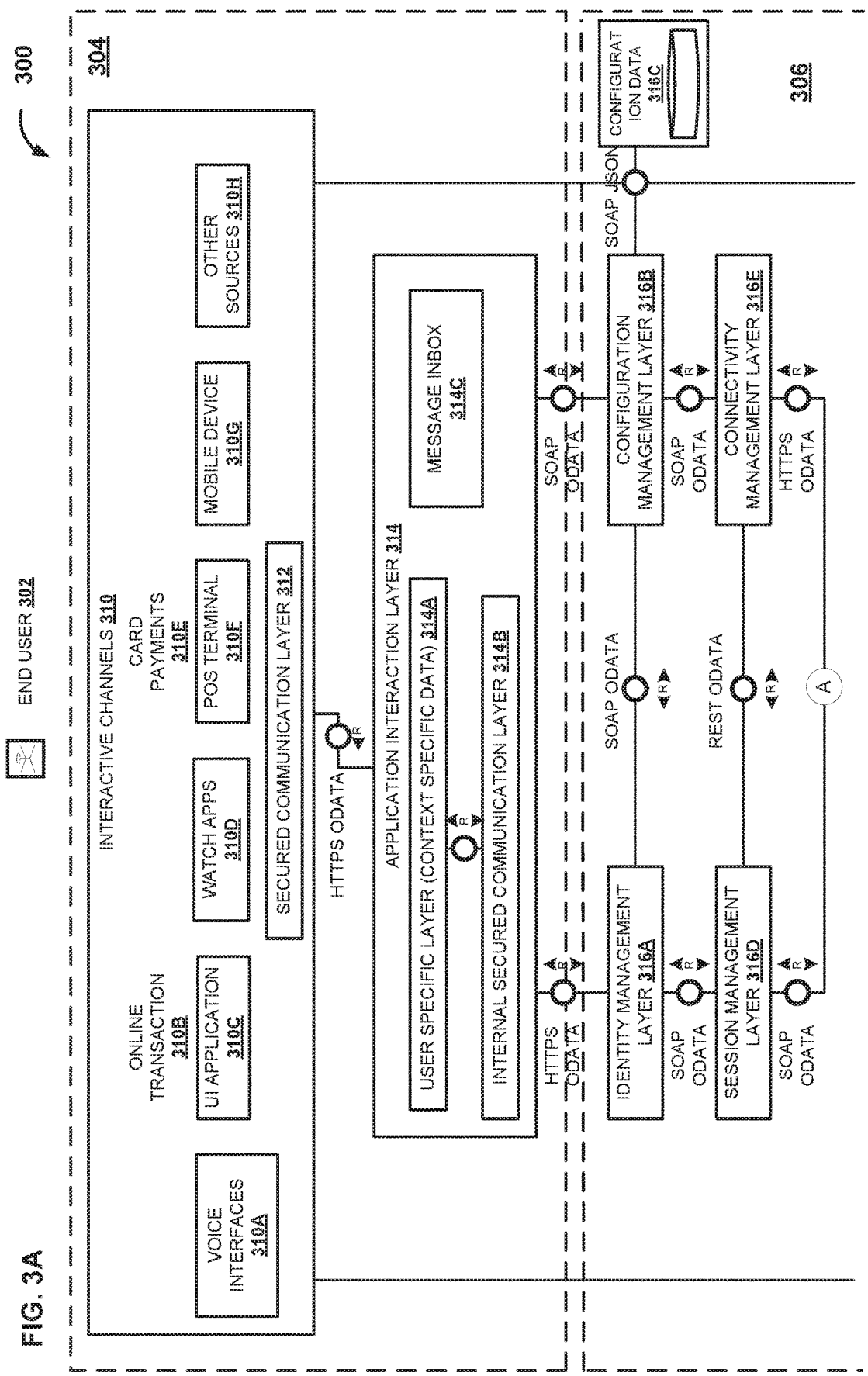
FIGS. 3A-3B are block diagrams illustrating a high-level architecture to execute processing a payment event, according to an embodiment.
Figure 3B:
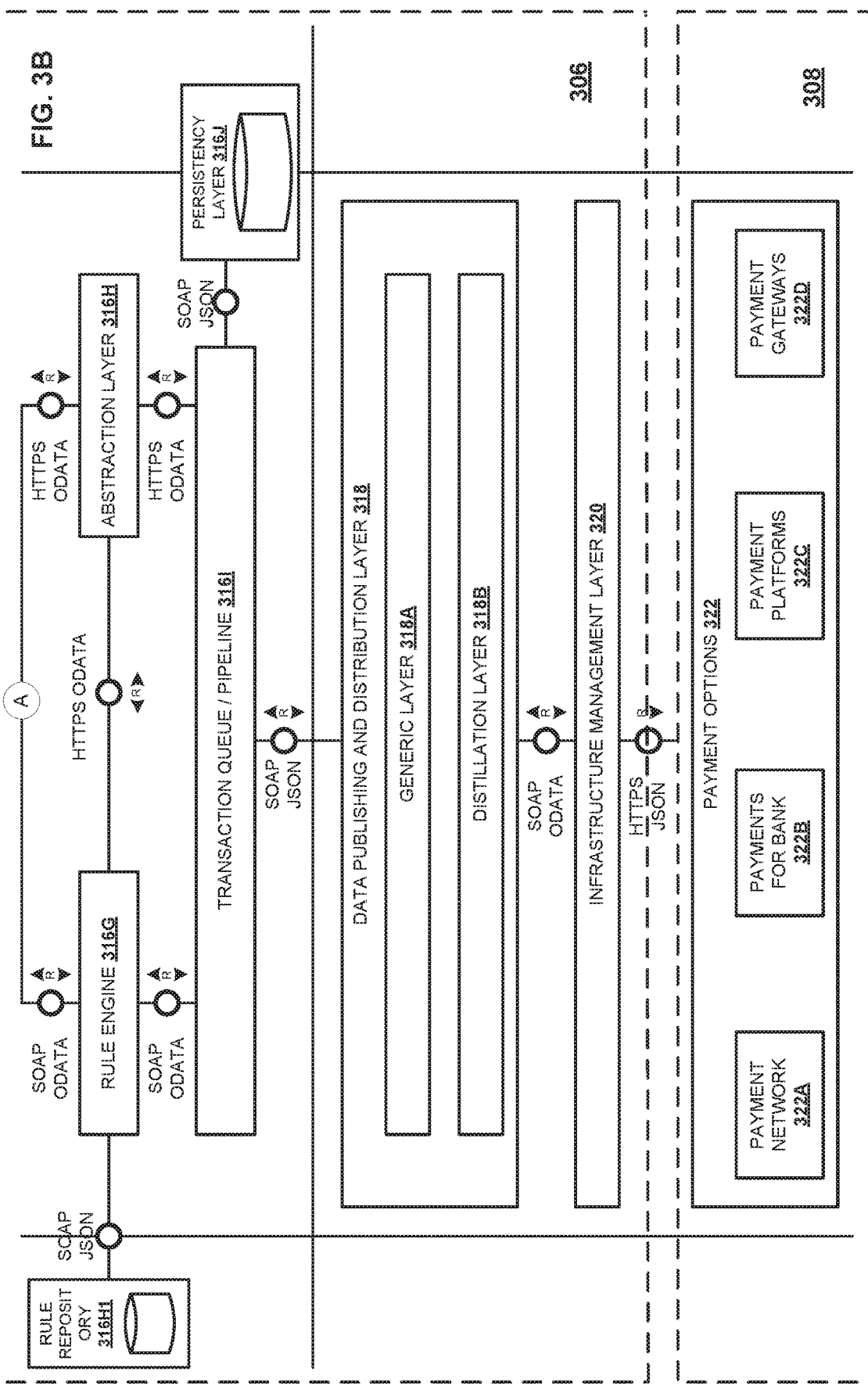

FIGS. 3A-3B are block diagrams illustrating a high-level architecture 300, to execute processing a payment event, according to an embodiment. FIGS. 3A-3B show a high-level architecture including framework 306 of integrated components (e.g., also referred to as layers) to execute processing a payment event. In an embodiment, high-level architecture 300 includes front end 304, framework 306 including integrated components that may be deployed as middleware in communication with backend 308. In an embodiment, front end 304 may include an integration of interactive channels 310, secured communication layer 312 and application interaction layer 314. In an embodiment, front end 304, framework 306 and backend 308 may be integrated for seamless communication of information and exchanging data. The front end 304 including the interactive channels 310 may provide, for example, voice interfaces 310A, platform for online transactions 310B (e.g., web services, browsers, etc.), user interface (UI) application 310C, watch applications 310D (e.g., smart watches), platform for card payments 310E, smart point of sale (POS) terminals 310F, mobile device 310G, other sources 310H, for initiating transaction requests. For example, end user 302 may interact with the interactive channels for initiating requests for payment events or transactions. In an embodiment, a request for a payment event may be initiated via interactive channels 310 may be received by application interaction layer 314 via secured communication layer 312 (e.g., using ODATA service via HTTPS mode of communication). The application interaction layer 314 may include components such as, user specific layer 314A that may include context specific data, internal secured communication layer 314B, message inbox 314C, etc. The application interaction layer 314 may process the request and forward the request to framework 306 for further processing. In an embodiment, user specific layer 314A may store contextual data associated with a specific context (e.g., generating context specific data). For example, the context specific data (e.g., may also correspond to payment context, configuration information, etc., as discussed previously) may correspond to include a combination specific device (e.g., mobile phone, smart watch, etc.) initiating the request for processing the payment event and the associated payment method (e.g., digital wallet, credit cards, debit cards, etc.), etc.

In an embodiment, end user 302 may initiate a request for a payment event via interactive channels 310 at front end 304. Such a request may also be referred to as a request for payment event, a transaction event, a transaction, etc., that may be received by application interaction layer 314 via secured communication layer 312. The component user specific layer 314A in application interaction layer 314 may additionally store user credential information, also referred to as user credentials associated with a user (e.g., user credentials as discussed previously including password). The user credentials may be used to validate the user. For example, the user credentials in combination with payment methods and/or the mode of interactive channel via which the payment event is initiate, etc., may generate context specific data for end user 302. In an embodiment, application interaction layer 314 may communicate with framework 306 via internal secured communication layer 314B in application interaction layer 314. In an embodiment, message inbox 314C may receive, store and provide notifications and information related to the transactions (e.g., successful, unsuccessful, pending, incomplete, etc.) initiated via interactive channels 310.

In an embodiment, application interaction layer 314 may communicate with the components identity management layer 316A and configuration management layer 316B (e.g., via simple object access protocol SOAP and OData) at framework 306. The configuration management layer 316B may store information related to the components shown in FIG. 3A and FIG. 3B. In an embodiment, the components in FIG. 3A and FIG. 3B may be identified by identifiers. The configuration management layer 316B may be configured to communicate with the component connectivity management layer 316E (e.g., SOAP and OData) and a repository or storage storing configuration data 316C. For example, such configuration data 316C may include context specific data, as discussed previously. During a design time, the configuration data or the user configuration data may be generated when specific payment methods, such as credit cards, debit cards, bank transfers, online payment services using mobile applications, etc.), etc., are associated with specific payment events. For example, when a user creates or sets up an account (e.g., also referred to as design time), the user may be provided a series of user interfaces that may request for specific information (e.g., for linking payment methods, device identifiers, user credentials, etc.). Depending on a time (e.g., design time or run time) when such data is referenced, it may correspond to configuration information, payment context, context specific data, etc. In an embodiment, such an association of the specific payments with the transactions or payment events may generate data that may also be referred to as payment context or payment contextual information/data. In an embodiment, identity management layer 316A in cooperation with configuration management layer 316B may execute multiple routines that may include a combination of multiple attributes and rules to validate the user identity. For example, the user may be validated by user name, password, e-mail address, etc., using OAuth tokens (e.g., standard protocols for authorization) that may be created for the user session.

In an embodiment, upon validating the user identity, session management layer 316D may establish user sessions to further process the payment events. The session management layer 316D may communicate with connectivity management layer 316E to access and retrieve data for establishing and managing the user sessions. As shown. FIG. 3A connects with FIG. 3B through connector A. In an embodiment, abstraction layer 316H may convert the request for the payment event into a common data format, for example, Java Script Notion Object (JSON) format and may further process the request by forwarding the request to a transaction queue/pipeline 3161. In an embodiment, transaction queue 3161 may correspond to a repository (e.g., data structure, a table, etc.) that may store multiple requests of payment events received from multiple users via interactive channels 310. In an embodiment, the component abstraction layer 316H may cooperatively work with the component rule engine 316G to execute rules and validate the forwarded request. For example, validating the request may include executing rules by rule engine by retrieving rules stored from rule repository 316H 1. In an embodiment, the rules stored in the rule repository 316H may be defined during the design time at the framework. The rules may be configured based on predetermined conditions, conditions. For example, when the payment event for purchasing books using a specific debit card exceeds more than $5000 USD for a specific month, the rules at framework 306 may be configured, such that the payment event is declined, when the condition for processing the payment event is not met. The rule engine 316G may execute rules based on a combination of attributes, for example user credentials, payment method for a specific event, the connectivity details information/data associated with a specific payment context, etc. In an embodiment, the requests for execution of the payment events may further be validated at abstraction layer 316H by multiform factor authentication techniques. For example, the multiform factor authentication techniques (e.g., using a combination of user name, passwords, OTP, secure identification techniques, biometric identification techniques, etc.) may be automated or configured to be executed manually by executing predefined rules for authenticating the users and/or payment requests.

In an embodiment, the payment events or transactions may be locked upon authenticating the user and/or payment event. In an embodiment, the transactions or payment events stored in transaction queue 3161 may be processed sequentially (e.g., based on an ascending order or first in of the received requests/payment events/transactions) or may be based on a priority. In an embodiment, transaction queue 3161 may be configured to store multiple requests for multiple payment events from multiple users. The priority for processing the payment events or transactions may be assigned based on predefined rules. For example, such predefined rules may include source or type of interactive channel (e.g., UI applications, voice interfaces, watch apps, etc.) from which the request or payment event may be initiated, user credentials or user profile, etc. In an embodiment, the transactions may be stored in transaction queue 3161 or may be persisted in a persistency layer 316J working in cooperation with transaction queue 3161. In an embodiment, persistency layer 316J may persist or store data that may be replicated from transaction queue 3161. The data stored in persistency layer 316J may be retrieved and payment event may be reprocessed, when the data in transaction queue 3161 becomes inconsistent or corrupt. In an embodiment, in an event of detection that the data stored in transaction queue 3161 is inconsistent, the data in persistency layer 316J may be retrieved and used for further processing the payment events.

In an embodiment, upon processing the execution of the request, the request or the transaction may be further processed by a component data publishing and distribution layer 318. The data publishing and distribution layer 318 may include an integration of components such as generic layer 318A and distillation layer 318B. The generic layer 318A may be configured to assign priorities to process the payment events based on predefined conditions. For example, based on the assigned priorities, generic layer 318A may generate or create clusters (e.g., also referred to as buckets) of the payment events and such clustered payment events may further be processed by a component infrastructure management layer 320. The component infrastructure management layer 320 may concurrently execute the multiple clusters in parallel for securely processing the payment events.

In an embodiment, based on the number of requests or number of payment events in transaction queue 3161, distillation layer 318B may create containers for concurrently execute the multiple clusters in parallel for processing the payment events. The distillation layer 318B may determine the resources required for concurrently executing the multiple clusters for processing the payment events. For example, determining such resources may include determining memory, processors, number of parallel threads to be created, etc., for concurrently processing the tasks (e.g., payment requests or transactions) in parallel. In an embodiment, the tasks may concurrently be executed in the same system or on different systems and a task may be executed without interrupting another task. In such a scenario, critical sections for the execution of tasks may be created, such that the critical sections may include data and/or sections of memory that may be accessed and modified by other tasks. In an embodiment, 318B distillation layer may create the containers at a run time (e.g., when the payment events or transactions are being processed or executed).

In an embodiment, distillation layer 318B may be configured to assign a token (e.g., process execution or job execution token) to multiple processors, when a page of memory is transferred into the shared memory. The job token for each processor may assign a portion of the shared memory for processing multiple requests (e.g., requests associated with payment requests). In an embodiment, upon completion of processing of the multiple requests within the portion of the shared memory, the job token may be modified to reassign to a new portion of the shared memory or the job token is modified to reassign the corresponding processor to a different pool of processors, or the job token may be deleted to release the processor. The job tokens may provide a mechanism for locking the processors such that the processors execute operations on the portion of the page of memory that are assigned to them. Such an above mechanism may optimize managing and controlling the distribution of tasks for processing multiple requests between the multiple processors.

In an embodiment, the above described mechanism of using tokens for execution of tasks may provide exclusive locking mechanism of resources and data in the memory. For example, when tasks in critical sections are being executed, a task may access an object in the memory, a database table or a system resource via the token. For example, when the token is assigned to a first task, a second task may not be executed until the token assigned to the first task is released. In an embodiment, the tasks may be executed in different systems (e.g., cross-system processes) using cross system lock (CSL) mechanism that may include a cross-transaction lock. In such an arrangement, programs or set of instructions for executing multiple tasks may compete for assignment of tokens. In an embodiment, a simple cross-system lock may be assigned until the execution of the logical unit of work (LUW) ends or completes execution. In an embodiment, the CSL mechanism, as described above, may be distributed program that may be managed by a token manager program or application. When an application or program or set of instructions for executing a task requests for a token using the CSL mechanism, the token manager may determine the status of the token (e.g., whether the token is assigned to another task or application or program or is available). Accordingly, the token manager may notify on the status of the token. In an embodiment, the CSL mechanism may provide a cross-system lock that may be released once the LUW is terminated or ended. The CSL mechanism may also provide a cross-transaction lock that may be released when the references for tokens do not exist. In an embodiment, the cross-transaction lock may correspond to be optimized cross-system lock. The token manager may assign or delegate the task to multiple worker nodes (e.g., computing nodes within the framework) and the worker nodes may validate the availability of resources such as memory, processors, etc., (that may be used for task execution) for the task and the resources may be locked using the token. When the execution of task is completed, the tokens may be released by the worker nodes to the token manager. In an embodiment, there may be multiple token managers in the framework and the multiple token managers may work cooperatively for optimal allocation of resources, respective worker nodes, etc. using shared database tables and shared memory.

In an embodiment, upon processing the requests for payment events at distillation layer, the requests for payment events may further be processed by a component infrastructure management layer 320. The distillation layer 318B may generate information by sorting the clusters of transactions, based on the payment context and forwards this information to infrastructure management layer 320. In an embodiment, distillation layer 318B may provide a centralized platform for routing the transactions or payment events based on the type of payment event and the associated payment methods. Routing the transactions may further be managed by configuring and executing rules based on the type of payment event and the associated payment methods. In an embodiment, distillation layer 318B may provide the platform for executing functionalities or operations, like processing the execution of payment events based on the configured rules (e.g., based on association of payment events and the payment methods), converting the requests to standard user defined format, communicating information related to the payment events or transactions, etc.

In an embodiment, the component infrastructure management layer 320 may add additional information (e.g., as a header information) to the payment events or the transactions. Such a mechanism of adding additional information may also be referred to as dynamic tunneling and the payment events or transactions may be sent to backend 308 to the component payment options 322. For example, such information may include IP address, port address, etc., through which the transactions or payment events may be processed. In an embodiment, the communication between the above layers may be dynamically established based on a transaction context (e.g., type of payment event, associated payment method, etc.). In an embodiment, infrastructure management layer 320 may provide a platform for establishing communication or connecting with multiple payment networks 322A, payments for banks 322B, payment platforms 322C, payment gateways 322D, etc., based on the above header information associated with the payment event or transaction.

In an embodiment, when a connection is successfully established and the information related to the payment event (e.g., header information, transaction context, etc.) are transferred, the payment event may be processed via corresponding payment options 322. Upon processing, the payment event may be executed by the corresponding system at backend 308. In an embodiment, upon successfully processing the payment event, the user session, the established connections, the transaction context, etc. may be terminated, and data and information associated with the system may be maintained in persistent state. The end user 302 may be logged out of the session and notified about a completion of execution of processing the payment event.

In an embodiment, the framework may provide a platform that is secured and configurable for processing payment events initiated via multiple interactive channels. The framework may provide a platform that may be advantageous for supporting multiple operational management capabilities such as message/requests queueing, tracking data and information associated with the users, payment events, etc., monitoring, determining and handling transaction/payment event errors, automatic retriggering of processes when network failure or communication link failure is detected, centrally logging and accessing all information related to payment events, platform for configuring and reconfiguring payment methods and payment events, centrally managing rules for authorizing users, routing payment events, etc., providing platform for managing workflow of payment events, supporting reporting and analytical operations and functionalities. In an embodiment, the above framework may be scaled and adapted to process payment events in real time such that the operational capabilities for processing payment events are improved or optimized. The framework may be deployed in an on-premise environment or distributed computing environment (e.g., cloud computing environment).

In an embodiment, the secured and configurable framework may provide optimized benefits such as improved bookkeeping capabilities, consolidated audit trail, consolidated ledger and transactions, operational improvements, efficient regulatory and compliances, optimized point to point communication, optimized time for data replication, optimizes the complexity of simultaneously communicating with multiple diverse systems and applications, provides unified architecture for managing payment events and payment governance processes, provides simplified landscape by eliminating the need for multiple interfaces for simultaneously working in cooperation with multiple systems and applications, provides lower total cost of ownership (TCO), provides a platform for unified payment processing and reporting, on demand scaling and flexibility, real time business integration capabilities, maintain data integrity and interoperability, efficient resource utilization, improved performance, etc., thereby improving the operational capabilities of the system for managing the processes for executing the payment events.

Some embodiments may include the above-described methods being written as one or more software components. These components, and the functionality associated with each, may be used by client, server, distributed, or peer computer systems. These components may be written in a computer language corresponding to one or more programming languages such as functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
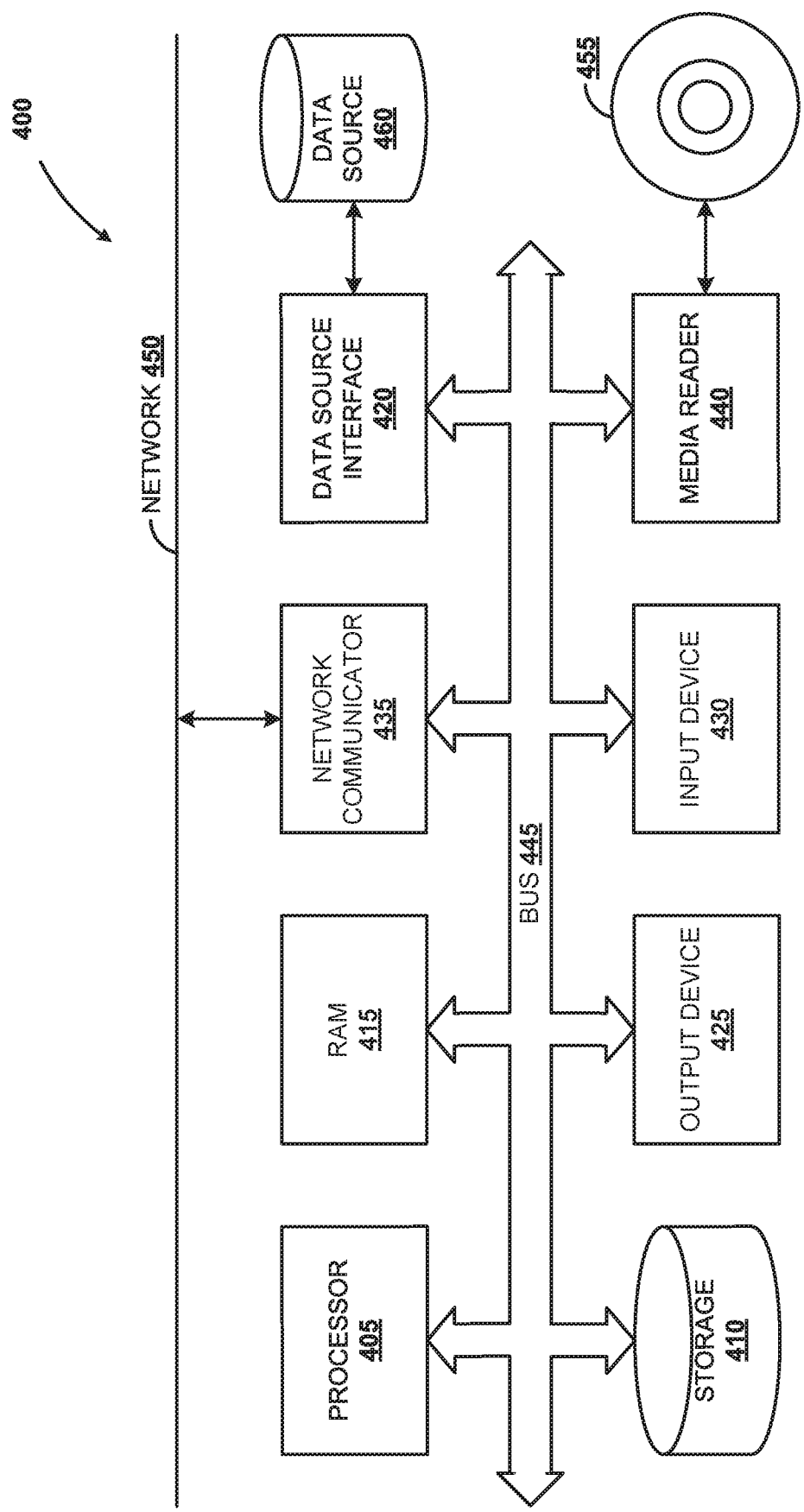
FIG. 4 is a block diagram of a computer system, according to an embodiment.

FIG. 4 is a block diagram of an exemplary computer system 400, according to an embodiment. Computer system 400 includes processor 405 that executes software instructions or code stored on computer readable storage medium 455 to perform the above-illustrated methods. Processor 405 can include a plurality of cores. Computer system 400 includes media reader 440 to read the instructions from computer readable storage medium 455 and store the instructions in storage 410 or in random access memory (RAM) 415. Storage 410 provides a large space for keeping static data where at least some instructions could be stored for later execution. According to some embodiments, such as some in-memory computing system embodiments, RAM 415 can have sufficient storage capacity to store much of the data required for processing in RAM 415 instead of in storage 410. In some embodiments, all of the data required for processing may be stored in RAM 415. The stored instructions may be further compiled to generate other representations of the instructions and dynamically stored in RAM 415. Processor 405 reads instructions from RAM 415 and performs actions as instructed. According to one embodiment, computer system 400 further includes output device 425 (e.g., a display) to provide at least some of the results of the execution as output including, but not limited to, visual information to users and input device 430 to provide a user or another device with means for entering data and/or otherwise interact with computer system 400. Each of these output devices 425 and input devices 430 could be joined by one or more additional peripherals to further expand the capabilities of computer system 400. Network communicator 435 may be provided to connect computer system 400 to network 450 and in turn to other devices connected to network 450 including other clients, servers, data stores, and interfaces, for instance. The modules of computer system 400 are interconnected via bus 445. Computer system 400 includes a data source interface 420 to access data source 460. Data source 460 can be accessed via one or more abstraction layers implemented in hardware or software. For example, data source 460 may be accessed by network 450. In some embodiments data source 460 may be accessed via an abstraction layer, such as a semantic layer.

A data source is an information resource. Data sources include sources of data that enable data storage and retrieval. Data sources may include databases, such as relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system. XML data), files, a plurality of reports, and any other data source accessible through an established protocol, such as Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to execute processing a payment event, comprising:
    providing a framework including a plurality of layers that integrate a front end system and a back end system to execute processing of the payment event, wherein the front end system includes an interactive channel and an application layer and the back end system includes multiple systems and applications;
    via the interactive channel of the front end system integrated with the framework, receiving at the application layer a request for initiating a payment event from a smart device via a smart terminal;
    upon processing the initiated request, authenticating the received request via a first portion of the plurality of layers at the framework based on a configuration information associated with the payment event, the configuration information generated by the framework;
    when the authentication is successful, establishing a session via a second portion of the plurality of layers of the framework with the back end system to process the payment event;
    based on the established session, determining via a third portion of the plurality of layers of the framework whether to execute processing the payment event based on a combination of a transaction context associated with the payment event and a device identifier associated with the smart device at the framework;
    based on the determination, executing processing the payment event at the back end system; and
    scaling the framework, via the plurality of layers, based on an evolving demand requirement to provide a unified architecture platform that integrates multiple systems and applications.

2. The computer implemented method of claim 1, further comprising: when the authentication is unsuccessful, sending an authentication failure notification to the smart terminal in response to the initiated payment event.

3. The computer implemented method of claim 1, further comprising: based on configuration information associated with a type of the payment event, determining a payment context associated with the payment event at the framework.

4. The computer implemented method of claim 1, wherein determining the transaction context comprises:
    based on the configuration information associated with the payment event, determining one or more attributes of the payment event;
    determining one or more parameters associated with the smart device; and
    based on a combination of the determined one or more attributes of the payment event and the one or more parameters of the smart device, determining whether to execute processing the payment event.

5. The computer implemented method of claim 1, further comprising:
    based on a combination of the type of the payment event and one or more constraints associated with the payment event, determining a transaction limit for the payment event; and
    based on the determined transaction limit for the payment event, determining whether to execute processing the payment event.

6. The computer implemented method of claim 1, wherein the smart device is selected from a group consisting a smart ring, a smart watch, a wearable computer, a smart keychain, a smart card, a mobile application, a near frequency communication electronic device or a combination thereof.

7. A computer system to execute processing a payment event, comprising:
    a framework including a plurality of layers that integrate a front end system and a back end system to execute processing of the payment event, wherein the front end system includes an interactive channel and an application layer and the back end system includes multiple systems and applications;
    a memory storing computer instructions; and
    a processor communicatively coupled with the memory to execute the instructions to perform operations comprising:
    via the interactive channel of the front end system integrated with the framework, receive at the application layer a request for initiating a payment event from a smart device via a smart terminal;
    upon processing the initiated request, authenticate the received request via a first portion of the plurality of layers at the framework based on a configuration information associated with the payment event, the configuration information generated by the framework;

when the authentication is successful, establish a session via a second portion of the plurality of layers of the framework with the back end system to process the payment event;

based on the established session, determine via a third portion of the plurality of layers of the framework whether to execute processing the payment event based on a combination of a transaction context associated with the payment event and a device identifier associated with the smart device at the framework;

based on the determination, execute processing the payment event at the back end system; and scaling the framework, via the plurality of layers, based on an evolving demand requirement to provide a unified architecture platform that integrates multiple systems and applications.

8. The computer system of claim 7, further comprising: when the authentication is unsuccessful, sending an authentication failure notification to the smart terminal in response to the initiated payment event.

9. The computer system of claim 7, further comprising: based on configuration information associated with a type of the payment event, determining a payment context associated with the payment event at the framework.

10. The computer system of claim 7, wherein determining the transaction context comprises:

based on the configuration information associated with the payment event, determining one or more attributes of the payment event;

determining one or more parameters associated with the smart device; and based on a combination of the determined one or more attributes of the payment event and the one or more parameters of the smart device, determining whether to execute processing the payment event.

11. The computer system of claim 7, further comprising:

based on a combination of the type of the payment event and one or more constraints associated with the payment event, determining a transaction limit for the payment event; and based on the determined transaction limit for the payment event, determining whether to execute processing the payment event.

12. The computer system of claim 7, wherein the smart device is selected from a group consisting a smart ring, a smart watch, a wearable computer, a smart keychain, a smart card, a mobile application, a near frequency communication electronic device or a combination thereof.

13. The computer system of claim 7, further comprising: a plurality of token manager programs to manage assignment of one or more resources to one or more worker nodes for an execution of one or more tasks, wherein the one or more worker nodes are computing nodes within the framework.

14. A non-transitory computer readable storage medium tangibly storing instructions, which when executed by a computer, cause the computer to execute operations comprising:

providing a framework including a plurality of layers that integrate a front end system and a back end system to execute processing of the payment event, wherein the front end system includes an interactive channel and an application layer and the back end system includes multiple systems and applications;

via the interactive channel of the front end system integrated with the framework, receive at the application layer a request for initiating a payment event from a smart device via a smart terminal;

upon processing the initiated request, authenticate the received request via a first portion of the plurality of layers at the framework based on a configuration information associated with the payment event, the configuration information generated by the framework;

when the authentication is successful, establish a session via a second portion of the plurality of layers of the framework with the back end system to process the payment event;

based on the established session, determine via a third portion of the plurality of layers of the framework whether to execute processing the payment event based on a combination of a transaction context associated with the payment event and a device identifier associated with the smart device at the framework;

based on the determination, execute processing the payment event at the back end system; and scaling the framework, via the plurality of layers, based on an evolving demand requirement to provide a unified architecture platform that integrates multiple systems and applications.

15. The non-transitory computer readable storage medium of claim 14, further cause the computer to execute operations comprising: when the authentication is unsuccessful, sending an authentication failure notification to the smart terminal in response to the initiated payment event.

16. The non-transitory computer readable storage medium of claim 14, further cause the computer to execute operations comprising: based on configuration information associated with a type of the payment event, determining a payment context associated with the payment event at the framework.

17. The non-transitory computer readable storage medium of claim 14, wherein determining the transaction context comprises:

based on the configuration information associated with the payment event, determining one or more attributes of the payment event;

determining one or more parameters associated with the smart device; and based on a combination of the determined one or more attributes of the payment event and the one or more parameters of the smart device, determining whether to execute processing the payment event.

18. The non-transitory computer readable storage medium of claim 14, further cause the computer to execute operations comprising:

based on a combination of the type of the payment event and one or more constraints associated with the payment event, determining a transaction limit for the payment event; and based on the determined transaction limit for the payment event, determining whether to execute processing the payment event.

19. The non-transitory computer readable storage medium of claim 14, wherein the smart device is selected from a group consisting a smart ring, a smart watch, a wearable computer, a smart keychain, a smart card, a mobile application, a near frequency communication electronic device or a combination thereof.

20. The non-transitory computer readable storage medium of claim 14, further comprising: a plurality of token manager programs to manage assignment of one or more resources to one or more worker nodes for an execution of one or more tasks, wherein the one or more worker nodes are computing nodes within the framework.

* * * * *